United States Patent [19]

Tiefenthaler

[11] Patent Number: 4,913,400

[45] Date of Patent: Apr. 3, 1990

[54] DOUBLE DISK GATE VALVE

[75] Inventor: Edelbert Tiefenthaler, Elgg, Switzerland

[73] Assignee: Sulzer Brothers Limited, Winterthur, Switzerland

[21] Appl. No.: 305,802

[22] Filed: Feb. 2, 1989

[30] Foreign Application Priority Data

Feb. 4, 1988 [CH] Switzerland .................. 00384/88

[51] Int. Cl.[4] .................................... F16K 25/00
[52] U.S. Cl. .................................... 251/175; 251/195; 251/31
[58] Field of Search .................. 251/175, 195, 31, 63, 251/327

[56] References Cited

U.S. PATENT DOCUMENTS 4,412,671  11/1983  Tiefenthaler .................. 251/175 X
4,658,851   4/1987  Koch ............................ 251/175 X Primary Examiner—Alan Cohan
Attorney, Agent, or Firm—Kenyon and Kenyon

[57] ABSTRACT

The double disk gate has a moving gate which includes two closure disks which define a space into which pressurized medium can be delivered. The closure disks are mounted to be moveable within the gate valve when the gate is in a closed position so as to be brought into sealing contact with the seating surfaces of the inlet and outlet ports of the valve. The pressure medium may be obtained from the medium passing through the valve.

8 Claims, 1 Drawing Sheet

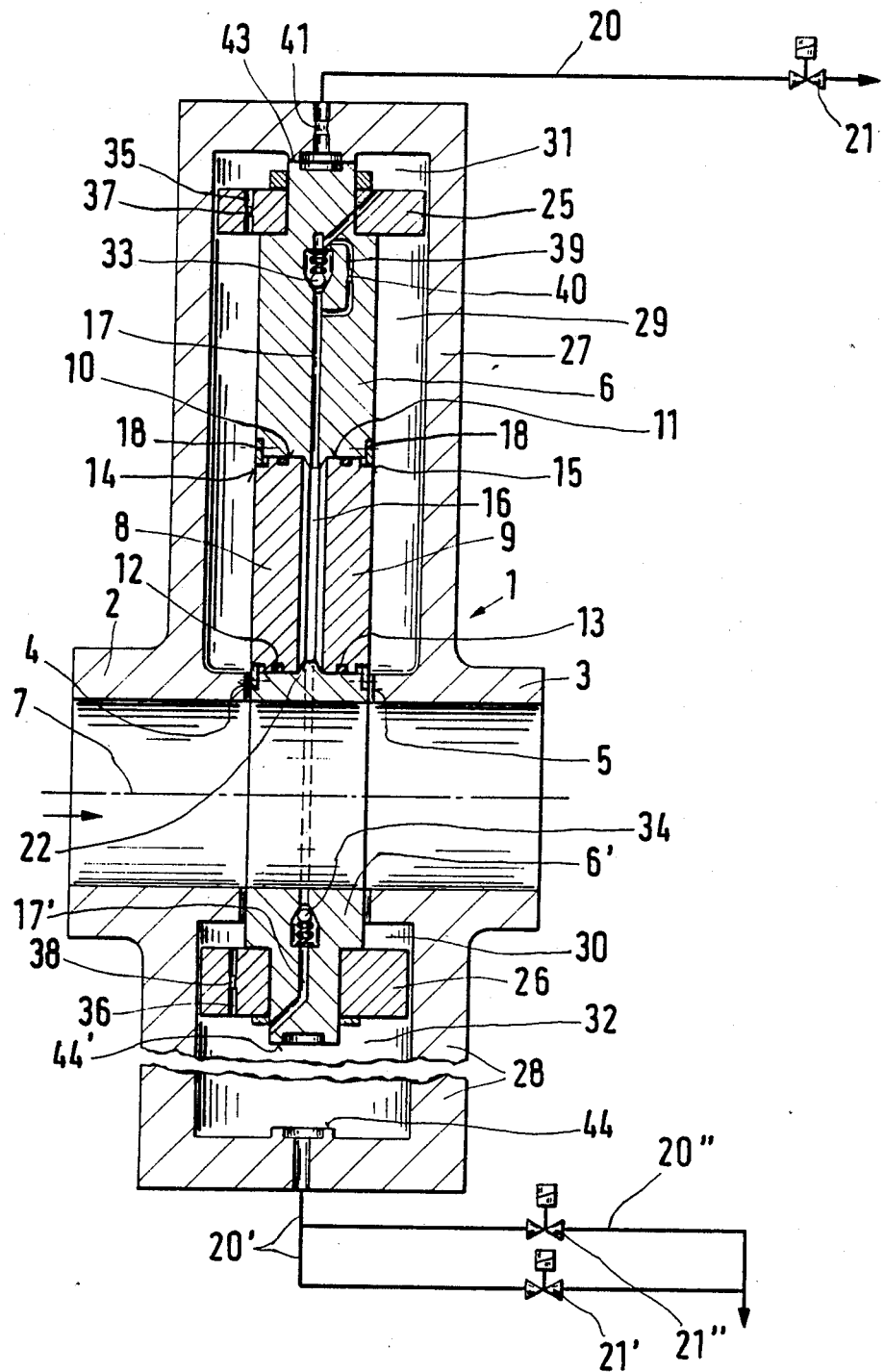

DOUBLE DISK GATE VALVE

This invention relates to a double disk gate valve.

Heretofore, various types of gate valves have been known for opening and closing pipe lines to a flow of fluid. For example, European Patent 052703 describes a double disk gate valve having a body with an inlet port, an outlet port and a gate which is moveable transversely between the ports. In addition, the gate is provided with two disks which are disposed between two opposite seat surfaces of the ports for sealingly engaging with the respective seat surface when the gate is in a closed position. In addition, a pair of servo pistons are provided diameterically opposite one another within respective cylinders of the valve body so as to divide the cylinders into inner and outer chambers. Each servo piston is also provided with a restrictor which communicates the chambers on opposite sides of the piston to each other. Each inner cylinder chamber also communicates with a flow chamber of the inlet port to receive fluid while each outer cylinder chamber is connected by way of a control valve to a pressure sink.

In the known construction, the two disks of the gate are mounted with a small play. Thus, when the gate is in a closed position, the pressure of the medium in the inlet port acts on the disk adjacent the outlet port so that this disk is pressed against the seat surface of the outlet port to shut off the flow of medium. In this case, the disk adjacent the inlet port experiences the pressure of the medium in the inlet port on both sides and, therefore, engages in a non-sealing manner with the associated seat surface.

Further, since the same pressure relationships exist on the gate disks during an opening movement and a closing movement, the sealing surface of the gate adjacent the outlet port slides on the seat surface thereof during these movements. As a result, the seat surfaces experience a rubbing action leading to possible wear and/or damage of the seat surfaces not to mention leaks.

Accordingly, it is an object of the invention to improve the construction of a double disk gate valve to avoid leakage.

It is another object of the invention to avoid rubbing of the disks of a gate valve on seat surfaces during opening and closing of the valve.

It is another object of the invention to enhance the sealing characteristics of a double disk gate valve.

Briefly, the invention provides a double disk gate valve which is comprised of a body having a coaxially disposed inlet port and outlet port, a seat surface at one end of each port facing the other seat surface, a gate having a pair of closure disks disposed between the ports for transverse movement therebetween, i.e., between a closed position aligned with the ports and an open position spaced from the ports.

In accordance with the invention, the closure disks define a space therebetween and a means is provided for selectively delivering a pressurized fluid into the space between the disks in order to press each disk against a respective seat surface in the closed position of the gate.

The presence of the pressurizable space between the disks enables complete seal tightness to be produced. That is, by pressurizing this space when the gate is the closed position, both disks are then in sealing engagement with the associated seating surface. Further, depressurization of the space before the start of an opening movement of the gate and during a closing movement obviates rubbing between the seating and sealing surfaces. The valve therefore insures outstanding seal tightness during a long working life.

The means for delivering the pressurized fluid into the space may communicate with the inlet port so as to deliver pressurized fluid from the inlet port into the space. Alternatively, the space may be pressurized by an external source of pressure medium.

These and other objects and advantages of the invention will become more apparent from the following detailed description taken in conjunction with the accompanying drawing wherein:

The drawing illustrates a cross-sectional view of a double disk gate valve constructed in accordance with the invention.

Referring to the drawing, the double disk gate valve is shown in an open position with the valve being actuated by its own medium, i.e., by the medium flowing through the valve.

As illustrated, the valve has a body 1 having an inlet port 2 and an outlet port 3 which are coaxially disposed and each of which has a plane seating surface 4, 5 at the respective end facing the other. The ports 2, 3 and seating surfaces 4, 5 are disposed coaxially of a common axis 7.

The valve also includes a gate 6 which is guided rectilinearly in the body 1 for transverse movement between the ports 2, 3 and, particularly, the seating surfaces 4, 5. The gate 6 has a pair of closure disks 8, 9 and an aperture tail section 6'. The gate 6 is moveable so that the closure disks 8, 9 are moveable between an open position spaced from the ports 2, 3, as viewed, and a closed position aligned with the ports 2, 3.

The body 1 is connected to a line (not shown) at the free ends of the ports 2, 3 for conveying a medium flowing under pressure, for example, water or vapor or gas.

The closure disks 8, 9 are mounted within the gate 6 so as to be moveable in the direction of the common axis 7 of the ports 2, 3. To this end, the peripheral surfaces of the disks 8, 9 are mounted in a bore or recess 10, 11 of the gate 6 while a ring seal 12, 13 is disposed within an annular groove of each disk 8, 9, respectively, to sealingly engage with the peripheral surface of the respective bore 10, 11, as illustrated. In addition, in order to prevent the disks 8, 9 from dropping out of the gate 6, ring disks 18 are secured to the opposite sides of the gate 6 adjacent and over the bores 10, 11 so as to engage the peripheral edges of the respective disks 8, 9. Alternatively, the edges of the disks 8, 9 and the edges of the bores 10, 11 may be constructed in the form of a bayonet connection.

The surfaces of the disks 8, 9 near the seating surfaces 4, 5 are in the form of plane annular sealing surfaces 14, 15, respectively. When the gate is in the closed position, these sealing surfaces 14, 15 sealingly engage with the associated seating surfaces 4, 5. As illustrated, the gate 6 has an inwardly extending annular bead 22 between those surfaces of the disks 8, 9 which are near one another. This bead 22 has lateral conical boundary surfaces which are effective as abutments for the disks 8, 9. Alternatively, the boundary surfaces may be parallel to each other instead of conical.

As shown, the disks 8, 9 are spaced apart to define a gap or space 16 which communicates with a duct 17 in the top part of the gate 6 which extends to the bead 22.

As indicated, the tail 6' of the gate is formed with an aperture of substantially the same contour and cross section as the corresponding ports 2, 3. Consequently, when the gate 6 is in the open position, a straight-through flow path exists for the medium flowing through the valve. The flow cross section of the inlet port 2 may, if required, be narrowed slightly conically and the flow cross section of the outlet port 3 may have a slight conical widening. In this case, the exit diameter of the port 2 and the entry diameter of the port 3 are equal to the internal diameter of the tail aperture.

The body 1 also has a pair of cylinders 27, 28 which extend coaxially in opposition to each other. In addition, pistons 25, 26, of the same diameter are mounted on the gate 6 and each is slidably disposed in a respective cylinder 27, 28. The piston 25 divides the cylinder 27 into an inner chamber 29 and an outer chamber 31 while the piston 26 divides the cylinder 28 into an inner chamber 30 and an outer chamber 32. The inner chambers 29, 30 are in communication with the flow chamber of the valve 1 near the seating surfaces 4, 5. The outer cylinder chamber 31 communicates via the duct 17 in the gate 6 with the space 16 between the closure disks 8, 9. In addition, a check valve 33 is disposed in the duct in order to block a flow of medium from the chamber 31 to the space 16. The other outer chamber 32 in the cylinder 28 communicates via a duct 17' in the gate 6 with the space 16 between the closure disks and also contains a check valve 34 which serves to block a flow of medium from the chamber 32 to the space 16. As indicated, the duct 17' extends around the aperture in the gate tail 6'.

Each piston 25, 26 has a duct 35, 36 which intercommunicates these cylinder chambers on opposite sides thereof with each other. In addition, each duct, 35, 36 is provided with a restrictor 37, 38.

A bypass duct 39 is also provided in the gate 6 which is in parallel with the check valve 33. This bypass duct 39 also has a restrictor 40 therein.

The gate valve has a means for selectively delivering a pressurized fluid into the space 16 between the closure disks 8, 9 in order to press each disk 8, 9 against a respective seat surface 4, 5 in the closed position. To this end, the means includes a line 20 which contains a control valve 21 and which extends to a pressure sink connected to the outer cylinder chamber 31. In addition, an annular back seat seal 43 is present in the zone to which the line 20 extends between the gate 6 and the end wall of the cylinder 27. A restrictor 41 is also disposed in the cylinder 27 in communication with the line 20. In addition, a line 20' which extends to a pressure sink and in which a control valve 21' is disposed is connected to the outer cylinder chamber 32. For reasons of redundancy, a further line 20" having a control valve 21" is provided in this case. An annular seating surface 44 is disposed in the end wall of the cylinder 28 near the place where the line 20' extends into the cylinder chamber 32. When the gate 6 is in the closed position, the surface 44 cooperates with a companion sealing surface 44' in the end wall of the cylinder 28 to form a back seat seal.

The valve operates as follows:

With the valve in the position shown, the gate 6 is in the open position. In order to keep the valve open, the control valve 21 remains in an open condition while the control valves 21', 21" are closed. Thus, the pressure of the medium flowing through the valve is present in the cylinder chambers 29, 30, 31, 32. Since the control valve 21 is open, the low pressure of the pressure sink exists in the back seat seal 43.

In order to close the gate 6, the valve 21 is closed and the valves 21', 21" are opened. The pressure of the medium previously present in the outer chamber 32 therefore drops abruptly to the low pressure of the pressure sink since the restrictor 38 in the piston 26 initially prevents pressure equalization between the chambers 30, 32. The same pressure remains effective in the inner chambers 30, 29 while the pressure of the medium which predominates in the chamber 31 causes the gate 6 to move into the closing position at a speed dependent upon the restrictor 37.

With the gate 6 in the closing position, the sealing surfaces 44, 44' engage each other while the disks 8, 9 are positioned before the seat surfaces 4, 5. With the gate 6 in this position, the pressure of the medium in the inlet port 2 is operative on the seal 43 whereas the low pressure of the pressure sink is operative in the closed seal 44, 44'. This same pressure acts on both sides of the disks 8, 9 during the closing movement of the gate 6 so that the disks 8, 9 move along the seat surfaces 4, 5 without friction. When the gate 6 has reached the closed position, the valves 21', 21" are closed while the valve 21 remains closed. Consequently, the pressure of the medium in the inlet port 2 exists in all four cylinder chambers 29-32. The medium now flows from the cylinder chamber 31 through the bypass duct 39 and restrictor 40 into the space 16 between the disks 8, 9 and presses the disks 8, 9 against the respective seat surfaces 4, 5.

In order to move the gate 6 back into the open position, valve 21 is opened while the valves 21', 21" remain closed. The opening of the valve 21 produces an abrupt pressure drop in the chamber 31 with the pressure drop then acting by way of the check valve 33 in the space 16. Thus, the force pressing the disks 8, 9 against the seat surfaces 4, 5 decreases considerably. Next, the pressure drop of the cylinder chamber 31 causes the gate 6 to rise into the open position shown. In this position, the low pressure of the pressure sink is reestablished in the seal 43 while the pressure of the medium is again operative in the four cylinder chambers 29-32.

In an alernative structure, the seat surfaces 4, 5 may extend conically instead of parallel to one another in the closing direction. In this event, the disks 8, 9 are retained with a corresponding conicity in the gate 6.

Alternatively, the valve may be modified so that the space 16 between the closure disks 8, 9 is pressurized by an external medium instead of by the medium passing through the valve. In this case, the pistons 25, 26 continue to be energized by the medium flowing through the valve in order to operate the gate 6.

The invention thus provides a double disk gate valve which can be operated in a manner to obviate friction between the sealing surfaces of the closure disks and the seating surfaces of the valve body.

What is claimed is:

1. A double disk gate valve comprising
a body having a coaxially disposed inlet port and outlet port, a first seat surface at one end of said inlet port, a second seat surface at one end of said outlet port facing said first seat surface, a first cylinder extending transversely of said ports and a second cylinder extending coaxially opposite said first cylinder;
a gate disposed between said ports for transverse movement therebetween, said gate having a pair of closure disks defining a space therebetween and movable between a closed position aligned with said ports and an open position spaced transversely from said ports;

a first piston mounted on said gate and slidably mounted in said first cylinder to define an inner chamber in communication with said inlet port and a outer chamber therein;

a first restrictor in said piston communicating said chambers with each other;

a second piston mounted on said gate and slidably mounted in said second cylinder to define an inner chamber in communication with said inlet port and an outer chamber therein;

a second restrictor in said second piston communicating said chambers of said second cylinder with each other;

means connecting said outer chambers to a pressure sink; and means communicating said outer chambers with said space between said closure disks to deliver pressurized fluid thereto to press each said disk against a respective seat surface in said closed position.

2. A valve as set forth in claim 1 which further comprises a first check valve between said outer chamber of said first cylinder and said space to block a flow of fluid to said space and a second check valve between said outer chamber of said second cylinder and said space to block a flow of fluid to said space.

3. A double disk gate valve comprising a body having a coaxially disposed inlet port and outlet port, a first seat surface at one end of said inlet port and a second seat surface at one end of said outlet port facing said first seat surface;

a gate disposed between said ports for transverse movement therebetween, said gate having a pair of closure disks defining a space therebetween and movable between a closed position aligned with said ports and an open position spaced from said ports; and means for selectively delivering a pressurized fluid into said space between said closure disks to press each said disk against a respective seat surface in said closed position.

4. A valve as set forth in claim 3 wherein said means communicates said inlet port with said space to deliver fluid from said inlet port into said space.

5. A valve as set forth in claim 3 which further comprises a first cylinder extending transversely of said ports, a first piston mounted on said gate and slidably mounted in said cylinder to define an inner chamber in communication with said inlet port and an outer chamber, a first restrictor in said piston communicating said chambers with each other and valve means for communicating said outer chamber with a pressure sink with said closure disks in said closing position whereby upon communication of said outer chamber with the pressure sink, said gate moves said closure disks to said open position.

6. A valve as set forth in claim 5 which further comprises a second cylinder coaxially opposite said first cylinder, a second piston mounted on said gate and slidably mounted in said second cylinder to define an inner chamber in communication with said inlet port and an outer chamber, a second restrictor in said second piston communicating said chambers of said second cylinder, and valve means for communicating said outer chamber of said second cylinder with a pressure sink with said closure disks in said open position whereby upon communication of said outer chamber of said second cylinder with the pressure sink, said gate moves said closure disks to said closing position.

7. A valve as set forth in claim 6 further comprises a first check valve between said outer chamber of said first cylinder and said space to block a flow of fluid to said space and a second check valve between said outer chamber of said second cylinder and said space to block a flow of fluid to said space.

8. A valve as set forth in claim 7 which further comprises a by-pass duct in parallel to said first check valve and a restrictor in said duct.

* * * * *